United States Patent [19]

Fisher et al.

[11] Patent Number: 4,856,182

[45] Date of Patent: Aug. 15, 1989

[54] METHOD OF ASSEMBLING A SWITCH DEVICE WITH A SUPPORTING MEANS THEREOF

[75] Inventors: Lynn E. Fisher, Ft. Wayne, Ind.; Richard A. Wandler, Clinton, Iowa; James P. Frank, Rock Falls, Ill.

[73] Assignee: General Electric Company, Fort Wayne, Ind.

[21] Appl. No.: 203,904

[22] Filed: Jun. 8, 1988

Related U.S. Application Data

[62] Division of Ser. No. 33,975, Apr. 3, 1987, Pat. No. 4,781,726.

[51] Int. Cl.⁴ .................... H01H 11/06; H02K 15/14
[52] U.S. Cl. ......................................... 29/622; 200/408
[58] Field of Search ........................... 29/596, 598, 622; 310/42, 71; 200/67 R, 67 D, 67 DA, 67 DB, 67 F, 283

[56] References Cited

U.S. PATENT DOCUMENTS

| | | | |
|---|---|---|---|
| 2,683,844 | 7/1954 | Schaefer | 318/207 |
| 2,774,894 | 12/1956 | Antonidis et al. | 310/71 |
| 3,482,128 | 12/1969 | Keck et al. | 310/71 |
| 3,571,541 | 3/1971 | Bedocs et al. | 200/67 |
| 4,034,173 | 7/1977 | Crow et al. | 200/80 |
| 4,038,574 | 7/1977 | Crow et al. | 310/71 |
| 4,240,001 | 12/1980 | Hildebrandt et al. | 310/86 |
| 4,394,553 | 7/1983 | Feil | 200/67 DA |

FOREIGN PATENT DOCUMENTS

| | | |
|---|---|---|
| 618492 | 4/1921 | Canada ................. 310/71 |
| 1016119 | 1/1966 | United Kingdom . |
| 1072140 | 6/1967 | United Kingdom . |
| 1240864 | 7/1971 | United Kingdom . |
| 2148610 | 5/1985 | United Kingdom . |
| 2182501 | 5/1987 | United Kingdom . |

*Primary Examiner*—Carl E. Hall
*Attorney, Agent, or Firm*—Ralph E. Krisher, Jr.

[57] ABSTRACT

A method of assembling a switch device with a means for supporting it. The supporting means includes at least one face having a set of bosses thereon, and each boss has a free end and a ledge intermediate the free end and the at least one face. The switch device has an actuating lever with a pair of generally opposite trunnions thereon, and a set of terminals of the switch device each have a deformed end section. In practicing this method, the opposite trunnions of the actuating lever are seated on the ledges of at least some of the bosses. The terminals are associated in preselected positions therefor on a supporting means, and the deformed end sections of the terminals are disposed in overlaying spaced apart relation with at least the ledges on the at least some bosses thereby to capture the opposite trunnions between the at least some bosses and the terminals, respectively.

24 Claims, 10 Drawing Sheets

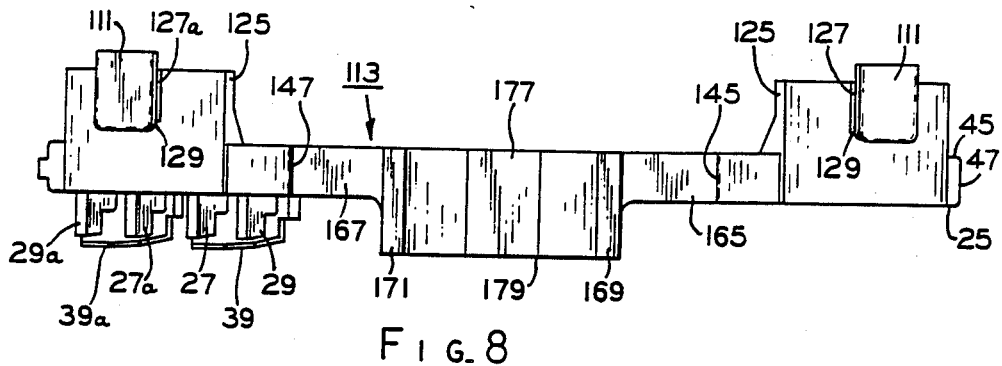
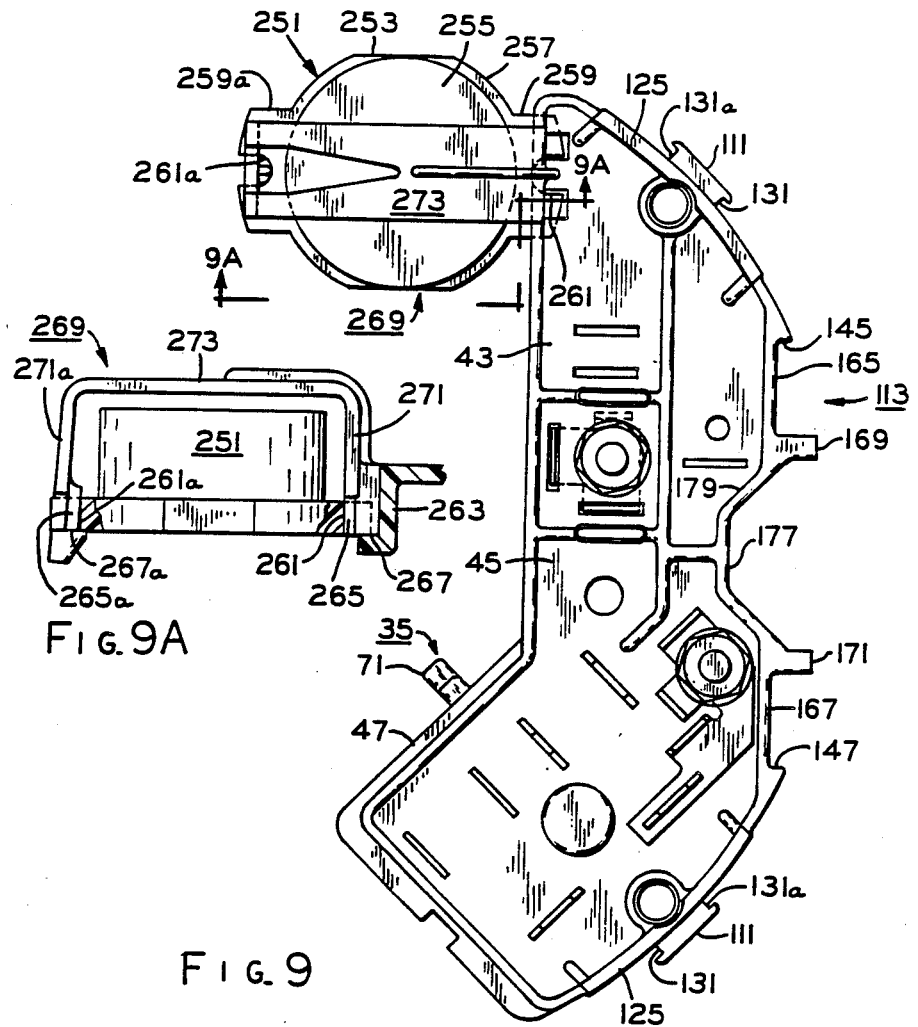

METHOD OF ASSEMBLING A SWITCH DEVICE WITH A SUPPORTING MEANS THEREOF

CROSS-REFERENCE TO RELATED APPLICATIONS

This application is a division of the copending commonly assigned application Ser. No. 033,975, filed Apr. 3, 1987, now Pat. No. 4,781,726, which is incorporated herein by reference.

FIELD OF THE INVENTION

This invention relates in general to electrical apparatus and in particular to a method of assembling a switch device with a means for supporting it.

BACKGROUND OF THE INVENTION

In various past dynamoelectric machines of types well known to the art, such as for instance a capacitor start or a split phase induction motor or the like, a centrifugal mechanism was conjointly rotatable with a rotor and shaft of such motor, and when power was initially applied to the motor, the start or auxiliary windings thereof were energized through a switch device mounted on a terminal board assembly within the motor. In response to the rotor and shaft attaining a preselected rotational speed during the starting energization of the auxiliary windings, the centrifugal mechanism was operable to actuate the switch device. When so actuated, the switch device was operable to effect the deenergization of the auxiliary windings thereby to terminate the starting energization or operation of the motor and, generally simultaneously therewith, effect the energization of the run or main windings of the motor. With the main windings so energized, the motor attained its preselected running speed and continued its running operation in response to the main winding energization. Of course, in some types of past motors, the auxiliary windings remained energized upon the energization of the main windings during the running operation of such past motors.

Various different schemes have been employed in the past to mount a terminal board assembly within an electric motor so that the switch device carried on the terminal board was accurately positioned for actuation by the centrifugal mechanism of the motor. In some of these past motors, the terminal board assembly was secured to mounting brackets therefor, and such mounting brackets were attached by suitable means either to an interior surface of a housing for such motors or to an end frame therefor. However, due to tolerance variation and/or tolerance build-up between the mounting brackets, the terminal board assembly and the motor housing or end frame, at least one of the disadvantageous or undesirable features of the aforementioned past constructions is believed to be that the terminal board assembly may not have been accurately located in a preselected position therefor to insure proper actuation of the switch device thereon by the centrifugal mechanism of the motor.

In other types of past electric motors as well as those types mentioned above, a set of winding leads extended from the motor windings for connection or termination with terminals provided therefor on the terminal board assembly of such motors. Since the terminal board assembly was mounted within the motor housing at least adjacent an end thereof or mounted to an end frame of the motor, the winding leads were extended across various structural and/or operating components of the motor, such as for instance an end turn grouping of the motor windings, through-bolts for securing the end frames to the motor housing, blower or fan blades which may have been either integral with or secured to the rotor of the motor, and the aforementioned centrifugal mechanism if such was employed in the particular motor. Thus, another disadvantageous or undesirable feature of the past motors is believed to be that interferring engagement between the winding leads and the aforementioned motor components may have been encountered which might have impaired the operation of some of such past motors. In U.S. Pat. No. 4,038,574, a motor is shown having a terminal board assembly with a guide, generally in the shape of a hook, extending therefrom, and the winding leads are passed through such hook shaped guide in frictional engagement therewith and terminated with terminals provided on the terminal board assembly.

In at least some of the aforementioned past motors, a power lead opening was provided through the motor housing generally adjacent the end thereof in which the terminal board assembly was mounted, and power leads were passed through the opening therefor so as to be terminated with terminals provided on the terminal board assembly. It is believed that generally the same disadvantageous or undesirable feature discussed above with respect to the interferring engagement between the winding leads and various other components of the motor may also be attendant to the power leads passed into the motor in the manner discussed above. In U.S. Pat. No. 4,038,574, a ramp structure is integrally provided on a terminal board assembly for leading the power leads from the opening provided therefor in the motor shell.

SUMMARY OF THE INVENTION

Among the objects of the present invention may be noted the provision of an improved method of assembling a switch device with a means for supporting it which at least in part overcomes the above discussed disadvantageous or undesirable features, as well as others, of the prior art; the provision of such improved method in which at least one switching means operable between a set of conductivity modes is conductively secured to a deformed end section of a terminal mounted to a supporting means for the switch device; the provision of such improved method in which a pair of opposite trunnions of a switch actuating means are captured between at least a pair of bosses on the supporting means and the terminals mounted thereto with the opposite trunnions being resiliently urged into pivotal seating engagement with the deformed end sections of the terminals; and the provision of such improved method in which component parts utilized in the practice of such improved method are simple in design, economically manufactured and easily assembled. These as well as other objects and advantageous features of the present invention will be in part apparent and in part pointed out hereinafter.

In general, a method is provided in one form of the invention for assembling a switch device with a means for supporting it. The supporting means includes at least one face having a set of spaced apart bosses thereon, and each boss has a free end and a ledge intermediate the free end and the at least one face thereof. The switch device includes an actuating lever having a pair of generally opposite trunnions, and a set of terminals each having a deformed end section. In practicing this method, the opposite trunnions of the actuating lever are seated on the ledges of at least some of the bosses. The terminals are associated in preselected positions therefor on the supporting means, and the deformed end sections of the terminals are disposed in overlaying spaced apart relation with at least the ledges on the at least same bosses thereby to capture the opposite trunnions between the at least some bosses and the terminals, respectively.

BRIEF DESCRIPTION OF THE DRAWINGS

FIG. 8 is a top elevational view of the terminal board assembly of FIG. 1;

FIG. 9 is a rear elevational view of the terminal board assembly of FIG. 1;

FIG. 9A is a partial side elevational view taken from FIG. 9;

Corresponding reference characters refer to corresponding parts throughout the several views of the drawings.

The exemplifications set out herein illustrate the preferred embodiments of the present invention in one form thereof, and such exemplifications are not to be construed as limiting either the scope of the invention or the scope of the disclosure thereof.

DETAILED DESCRIPTION OF THE PREFERRED EMBODIMENTS

Figure 1:
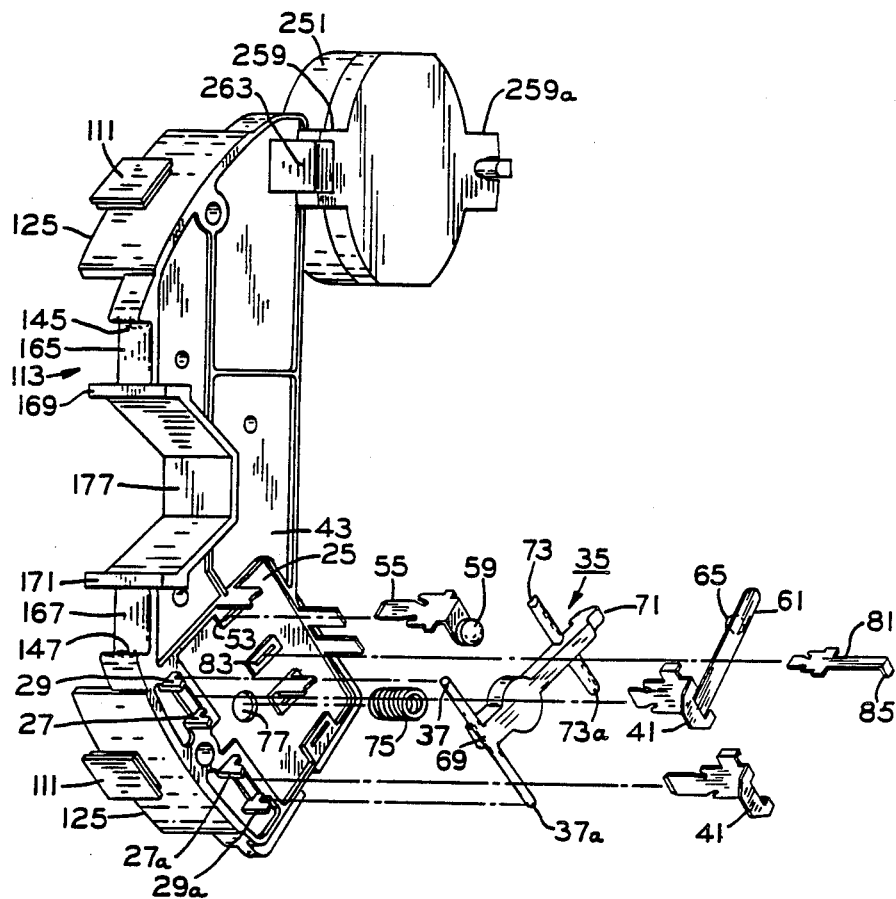
FIG. 1 is an exploded perspective view of a terminal board assembly and illustrating principles which may be practiced in a method of assembling a switch device in one form of the invention.
Figure 2:
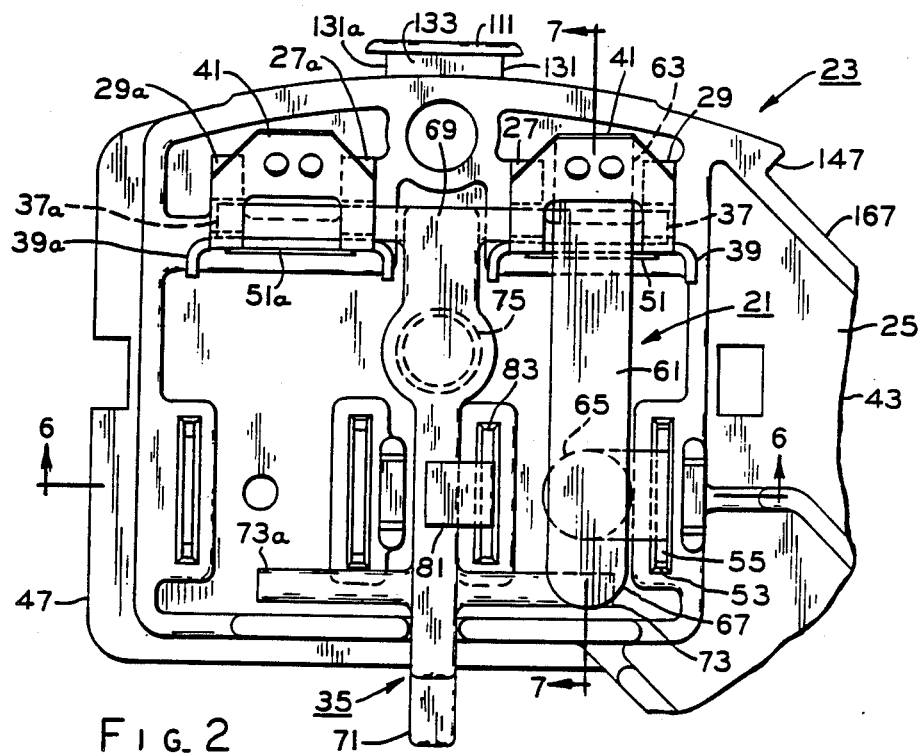
FIG. 2 is an enlarged partial front elevational view of the terminal board assembly of FIG. 1.
Figure 3:
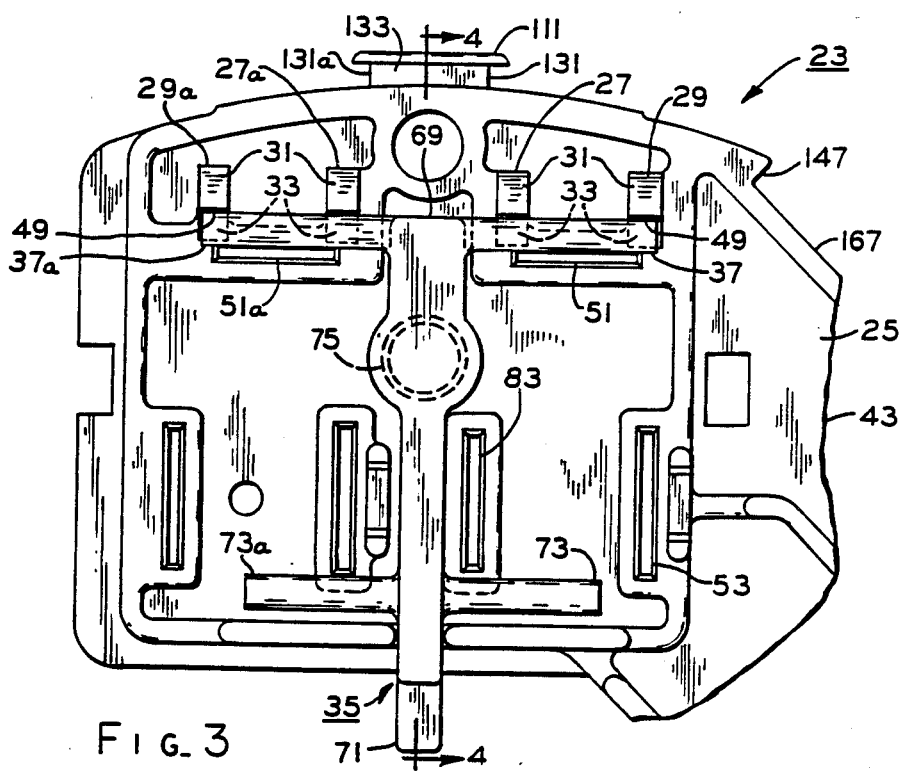
FIG. 3 is generally the same as FIG. 2 but with some components of the switch device removed to illustrate the association of an actuating lever of the switch device with a set of bosses on the body of the terminal board assembly for seating the actuating lever during the assembling of the switch device.
Figure 4:
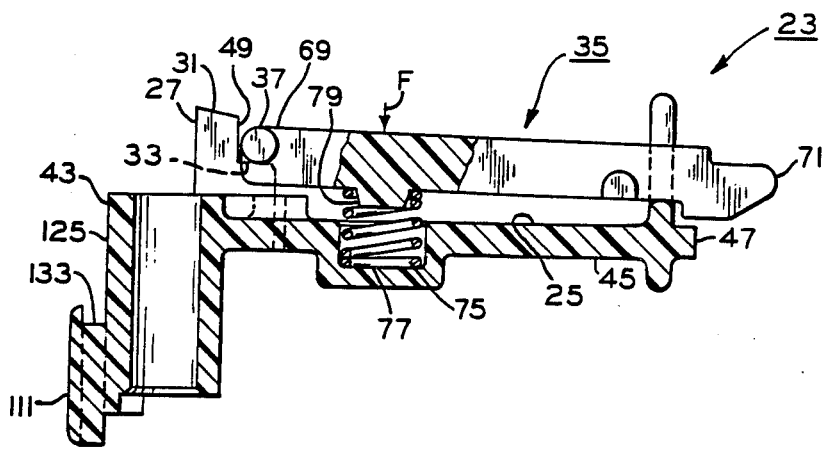
FIG. 4 is a sectional view taken along line 4—4 of FIG. 3.

With reference to the drawings in general, there is illustrated a method in one form of the invention of assembling a switch device 21 with a means for supporting it, such as for instance a terminal board or terminal board assembly 23 or the like (FIGS. 1-9). Supporting means or terminal board 23 includes at least one face 25 having a set of bosses 27, 27a and 29, 29a thereon, and each boss has a free end 31 and a ledge 33 intermediate the free end and face 25 of the terminal board (FIGS. 1 and 3-5). Switch device 21 includes an actuating lever 35 having a pair of opposite trunnions 37, 37a thereon, and the switch device also has a set of terminals 39, 39a each having a deformed end section 41 (FIGS. 1-3). In the practice of this assembling method, opposite trunnions 37, 37a of actuating lever 35 are seated on ledges 33 of bosses 27, 29 and 27a, 29a (FIGS. 1, 3 and 4). Terminals 39, 39a are associated in preselected positions therefor on terminal board 23, and deformed end sections 41 of the terminals are disposed in overlaying spaced apart relation with at least ledges 33 on bosses 27, 29 and 27a, 29a thereby to capture or cage opposite trunnions 37, 37a between the bosses and the terminals, respectively (FIGS. 1, 2 and 5-7).

More particularly and with specific reference to FIGS. 1-9, terminal board 23 is provided with a body 43 having a pair of generally opposite faces, such as for instance switch device or switch means supporting face 25 and a terminal connection face 45 opposite thereto, and a peripheral or marginal portion, such as for instance an edge or surface 47 or the like, is interposed between opposite faces 25, 45, respectively. Bosses 27, 27a and 29, 29a are integrally formed with opposite face 25 of terminal board body 43 so as to extend therefrom generally in aligned relation, and free ends 31 on the bosses are predeterminaly arranged in spaced apart relation from opposite face 25, respectively. A set of open sided recesses or slots 49 are provided in bosses 27, 27a and 29, 29a intersecting with free ends 31 thereof and defining ledges 33 on the bosses, and as previously mentioned, the ledges are intermediately spaced between the free ends of the bosses and opposite face 25 of terminal board body 43. A set of terminal receiving slots, including at least those indicated at 51, 51a and 53, are provided through terminal board body 43 at preselected positions or locations and intersect with opposite faces 25, 45 thereof; however, as best seen in FIGS. 1 and 9, other terminal receiving slots may be, if desired, provided in other preselected locations therefor through the terminal board body for termination convenience and connection versatility purposes, as later discussed, within the scope of the invention so as to meet at least some of the objects thereof. With respect to slots 51, 51a, it may be noted that such slots are predeterminately located at least generally adjacent bosses 27, 29 and 27a, 29a at the sides thereof in which open sided recesses 49 are formed, respectively, and slot 53 is arranged in predetermined spaced relation with slot 51 and bosses 27, 29, respectively.

In practicing the aforementioned assembling method, terminals 39, 39a and another terminal 55 are initially deformed so as to provide deformed end sections 41 generally opposite to electrical connector ends or sections 57 on such terminals, respectively, and a contact 59 is conductively secured to deformed end section 41 of terminal 55 by suitable means well known to the art. It may be noted that switch or switching means, such as for instance a generally thin elongate resilient switch blade or switch element 61, has one opposite end or end portion 63 thereof conductively secured to deformed end section 41 of terminal 39 by suitable means, such as for instance spot welding or the like, and another contact 65 is conductively secured by suitable means well known to the art to the switch element at least generally adjacent the other opposite end or end portion 67 thereof. Switch element 61 is also deformed for contact engagement purposes, as discussed hereinafter, and the switch element may be formed from any suitable material having the desired mechanical resiliency and electrical conductivity characteristics, such as for instance byrillium copper or the like.

Actuating lever or member 35 may be formed of any suitable resin or dielectric material and has a pair of generally opposite ends or end portions, such as a pivoted end 69 and a driven or force receiving end 71. Trunnions 37, 37a extend generally oppositely from actuating lever 35 at least generally adjacent its pivoted end 69, and a pair of generally opposite extension means, such as opposite extensions or abutments 73, 73a, extend generally oppositely from the actuating lever at least generally adjacent its driven end 71, respectively. Albeit not shown for the sake of brevity of disclosure and drawing simplification, it is contemplated that extension 73a may be, if desired, omitted from actuating device 35 within the scope of the invention so as to meet at least some of the objects thereof.

Figure 5:
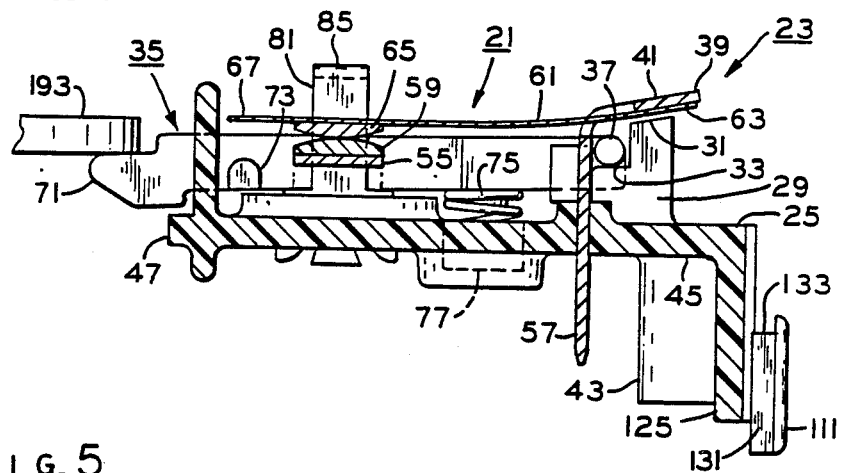
FIG. 5 is a partial sectional view of the terminal board assembly of FIG. 2 illustrating the association of a switch device therewith.

As best seen in FIGS. 3 and 4, opposite trunnions 37, 37a on actuating lever 35 are seated or otherwise arranged in engagement with ledges 33 on bosses 27, 29 and 27a, 29a and resilient means, such as a coil spring 75 or the like for instance, is interposed between terminal board 23 and actuating lever 35. One end of coil spring 75 is seated in a retaining recess 77 therefor in face 25 of terminal board body 43, and the other end of the spring is seated about a retainer 79 therefor on actuating lever 35 between opposite ends 69, 71 thereof. In order to maintain the seated relation of trunnions 37, 37a with ledges 33 on bosses 27, 27a during the assembly of switch device 21, an assembly or holding force F is applied or exerted on actuating lever 35 thereby to compress spring 75 containing the compressive force thereof between the actuating lever and terminal board body 43. Thus, in response to holding force F, actuating lever 35 is urged toward a depressed position toward opposite face 25 of terminal board body 43 with opposite end 71 of the actuating lever extending beyond peripheral portion 47 of the terminal board body, as best seen in FIG. 5. Albeit not shown for purposes of brevity of disclosure and drawing simplification, it is contemplated that actuating lever 35 in the depressed position thereof could engage opposite face 25 of terminal board body 43 adjacent peripheral portion 47 thereof within the scope of the invention so as to meet at least some of the objects thereof.

Either before or subsequent to the association of actuating lever 35 with terminal board body 43, terminal 55 may be inserted or predeterminately positioned in slot 53 provided therefor in the terminal board body thereby to extend electrical connector section 57 of the terminal beyond opposite face 45 of the terminal board body and to arrange deformed end section H1 of the terminal in overlaying relation with opposite face 25 of the terminal board body at least generally adjacent thereto, as best seen in FIG. 5. Terminal 55 may be secured in its predetermined position by suitable means, such as staking or the like for instance, to the terminal board body against displacement therefrom.

Upon the above discussed securement of terminal 55 to terminal board body 43, terminals 39, 39a may likewise be inserted or predeterminately positioned in slot 51, 51a provided therefor in the terminal board body thereby to extend electrical connector sections 57 of the terminals beyond opposite face 45 of the terminal board body and to extend or otherwise associate deformed end sections 41 of the terminals at least in part in overlaying relation with free ends 31 of bosses 27, 29 and 27a, 29a and with ledges 33 thereof, respectively. When terminals 39, 39a are predeterminately positioned in slots 51, 51a with respect to terminal board body 43, it may be noted that the terminals are arranged at least generally adjacent bosses 27, 29 and 27a 29a so as to extend along open sided recesses 49 therein, and the overlaid deformed end sections 41 on the terminals are arranged in predetermined spaced apart relation from ledges 33 on the bosses, respectively. Terminals 39, 39a may be secured in the above discussed predetermined positions thereof by suitable means, such as staking or the like for instance, to terminal board body 43 against displacement therefrom, and with the terminals so secured in their predetermined or assembly positions, it may be noted that opposite trunnions 37, 37a on actuating lever 35 are caged or captured within recesses 49 in bosses 27, 29 and 27a, 29a, between the bosses and the terminals, respectively. While opposite trunnions 37, 37a of actuator lever 35 are illustrated herein as being seated on ledges 33 of bosses 27, 29, and 27a, 29a respectively, it is contemplated that the opposite trunnions may be provided on the actuating lever so as to be seated on ledges 33 of only bosses 27, 29 in response to holding force F applied on the actuating lever within the scope of the invention so as to meet at least some of the objects thereof. Further, it is also contemplated that, if desired, bosses 27a, 29a may be omitted within the scope of the invention so as to meet at least some of the objects thereof.

When terminal 39 is secured in its predetermined position to terminal board body 43, as previously discussed, it may be noted that switch element 61 secured to the terminal is extended therefrom generally in parallel spaced apart relation with actuating lever 35 and generally in overlaying spaced apart relation with opposite face 25 on the terminal board body, stationary contact 59 of terminal 55 and opposite extension 73 on the actuating lever, respectively. As previously mentioned, switch element 61 is predeterminately deformed, and such deformation is effective to urge or bias movable contact 65 on free or opposite end 67 of the switch element toward making engagement with stationary contact 59 on deformed end section 41 of terminal 55 secured in its predetermined or assembled position to terminal board body 43.

Figure 6:
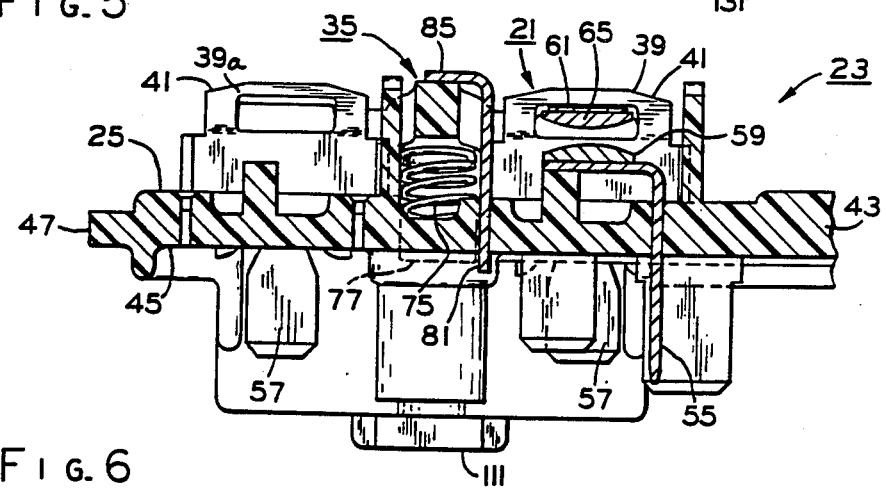
FIGS. 6 and 7 are sectional views taken along lines 6—6 and 7—7 in FIG. 2, respectively.

Subsequent to the securement of terminals 39, 39a to terminal board body 43 as discussed above, a metallic stop or abutment member 81 is inserted or predeterminately positioned in another slot 83 provided therefor through the terminal board body, and the stop is then secured to the terminal board body by suitable means, such as staking or the like for instance. A deformed distal end 85 on stop 81 extends into overlaying relation with actuating lever 35 for abutment therewith to limit the pivotal movement of the actuating lever, as best seen in FIG. 6 and as discussed hereinafter.

Figure 7:
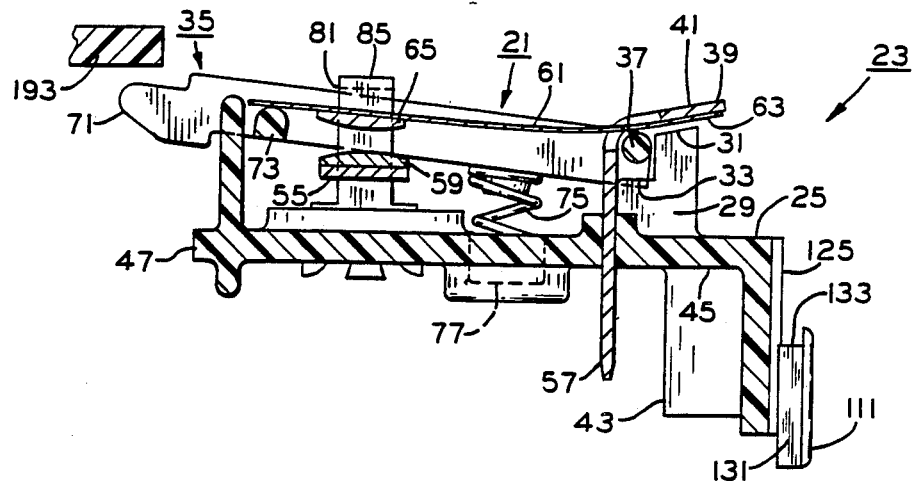

After stop 81 is secured to terminal board body 43, holding force F exerted an actuating lever 35 is removed therefrom, and the compressive force of spring 75 acting on the actuating lever is effective to move opposite trunnions 37, 37a on the actuating lever from their aforementioned seating engagement with ledges 33 on bosses 27, 29 and 27a, 29a toward seating or pivotal engagement against deformed end sections 41 on terminals 39, 39a, respectively, as best seen in FIGS. 2 and 7. Generally at the same time, the compressive force of spring 75 is also effective to move actuating lever 35 from its depressed position into abutment with deformed distal end 85 on stop 81 thereby to limit the pivotal movement or displacement of the actuating lever with respect to opposite face 25 of terminal board body 43. In response to the resiliently urged movement of actuating member 35 into abutment with stop 81, extension 73 on the actuating lever is drivingly engaged with switch element 61 at least generally adjacent its free end 67 which, in turn, effects the pivotal movement of the switch element about deformed end section 41 of terminal 39 thereby to break movable contact 65 on the switch element from stationary contact 59 on terminal 55. Thus with opposite trunnions 37, 37a caged or captured between bosses 27, 29a and 27a, 29a and terminals 39, 39a, as previously discussed, it may be noted that the compressive force of spring 75 is effective to bias actuating lever 35 toward a preselected or assembly position on terminal board assembly 23, and when the actuating lever is in its preselected position, it should also be noted that the trunnions are biased or urged toward engagement with deformed end sections 41 of terminals 39, 39a for pivotal movement thereon, respectively. To complete, the description of assembling switch device 21, a pair of laterally spaced apart guide means 87, 87a for guiding therebetween actuating lever 35 may be, if desired, integrally formed on opposite face 25 of terminal board body 43 so as to extend therefrom at least generally adjacent peripheral portion 47 of the terminal board body.

Figure 10:
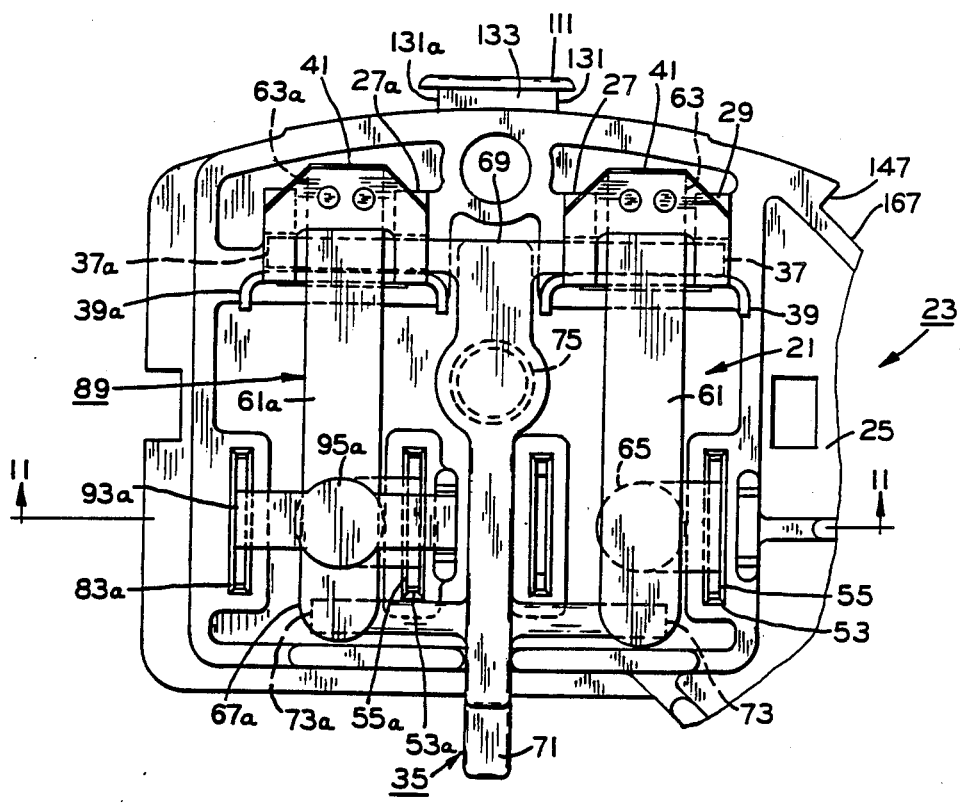
FIG. 10 is a partial front elevational view of an alternative terminal board assembly and illustrating principles which may be practiced in an alternative method of assembling a switch device in one form of the invention.
Figure 11:
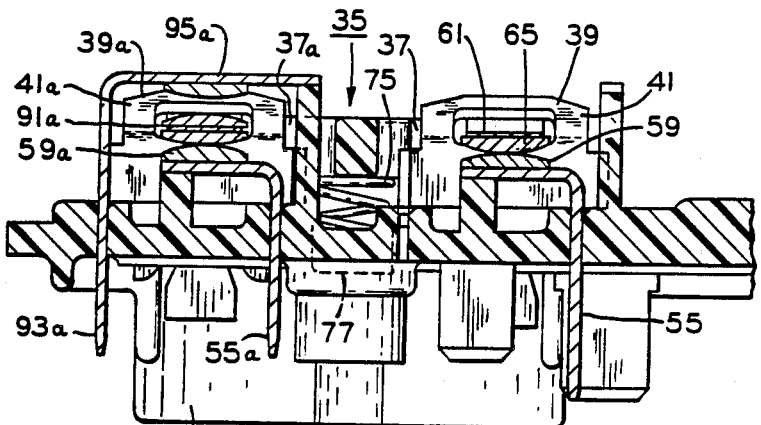
FIG. 11 is a sectional view taken along line 11—11 of FIG. 10.

In FIGS. 10 and 11, there is illustrated in one form of the invention an alternative method of assembling an alternative or two-speed switch device 89 with terminal board 23 and with the alternative switch device having generally the same component parts assembled and operable generally in the same manner as those of switch device 21 with the exceptions noted hereinafter. Further, while the alternative method meets at least some of the objects set out hereinbefore, it is believed that such alternative method exhibits indigenous objects and advantageous features which will be in part apparent and in part pointed out in the following discussion.

In this alternative assembly method, the previously discussed stop 81 is omitted. Another terminal 55a having a construction at least similar to the previously discussed terminal 55 is secured to terminal board body 43 at least generally at the same time as the above discussed securement thereto of terminal 55. In the securement of terminal 55a to terminal board body 43, the terminal may be inserted or predeterminately positioned in a slot 53a provided therefor in the terminal board body thereby to extend electrical connector section 57 of the terminal beyond opposite face 45 of the terminal board body and to arrange deformed end section 41 of the terminal in overlaying relation with opposite face 25 of the terminal board body at least generally adjacent thereto. Terminal 55a may be secured in its predetermined position by suitable means, such as staking or the like for instance, to terminal board body 43, and upon the securement of the terminal, another contact 59a conductively secured to deformed end section 41 of the terminal is positioned for making and breaking relation with a double contact 91a carried on another switch element 61a. Switch element 61a has a construction at least similar to the previously discussed switch element 61 except that opposite end portion 63a of switch element 61a is conductively secured by suitable means, such as spot welding or the like for instance, to deformed end section 41 of terminal 39a, and double contact 91a is secured to switch element 61a at least generally adjacent its opposite end portion 67a by suitable means well known to the art. The securement of terminal 39a and switch element 61a may occur either before, after or generally simultaneously with the above discussed securement of terminal 39 and switch element 61. Upon the above discussed securement of terminal 39a to terminal board body 43, it may be noted that switch element 61a secured to the terminal is extended therefrom generally in parallel spaced apart relation with actuating lever 35 in its previously discussed depressed position and generally in overlaying spaced apart relation with opposite face 25 on the terminal board body, stationary contact 59a of terminal 55a and opposite extension 73a on the actuating lever, respectively. Of course, switch element 61a is predeterminately deformed, and such deformation is effective to urge or bias movable double contact 91a on free end 63a of the switch element toward making engagement with stationary contact 59a of terminal 55a secured in its predetermined or assembly position to terminal board body 43.

Subsequent to the securement of terminals 39, 39a to terminal board body 43, as previously discussed, a stop terminal 93a is inserted or predeterminately positioned in a slot 83a provided therefor through the terminal board, and the stop terminal may be secured in its predetermined position to the terminal board body by suitable means, such as staking or the like for instance. When stop terminal 93a is secured to terminal board body 43, a stationary contact 95a on a deformed end section 41 of the stop terminal is arranged generally in overlaying spaced apart relation with stationary terminal 59a on terminal 55a for making and breaking relation with double contact 91a on switch element 61a. Upon the removal of holding force F from actuating lever 35, the compressive force of spring 75 is effective to displace the actuating lever from the depressed position toward the assembled position thereof, as previously mentioned. Upon this resiliently urged movement of actuating lever 35 toward its assembled position, opposite extensions 73, 73a on the actuating lever drivingly engage switch elements 61, 61a at least generally adjacent free ends 67, 67a thereof so as to effect the pivotal displacement of the switch elements about deformed end sections 41 of terminals 39, 39a, respectively. In response to the pivotal displacement of switch elements 61, 61a, movable contacts 65, 91a thereon are broken from stationary contacts 59, 59a on terminals 55, 55a, and double contact 91a is moved into making engagement with stationary contact 95a on stop terminal 93a. Thus, it may be noted that the making engagement between double contact 91a on switch element 61a with stationary contact 95a on stop terminal 93a not only limits the pivotal displacement of actuating lever 35 with respect to opposite face 25 on terminal board body 43 but is also effective to assist in defining the assembled position of the actuating lever.

Additionally, it is believed that the foregoing discussions of the methods of assembling switch devices 21, 89 to terminal board body 43 demonstrate the desired termination convenience and component mounting versatility of terminal board assembly 23. For instance, the discussion concerning the assembly of switch device 21 is directed toward the association of a single-pole single-throw switch element 61 with terminal board body 43 so as to be operated by actuating lever 35, and the discussion concerning the assembly of switch device 89 is directed toward the association of a double-pole double-throw switch element 61a with the terminal board body and generally in side-by-side relation with switch element 61 and with both switch elements 61, 61a being operated by the same actuating lever 35.

Figure 12:
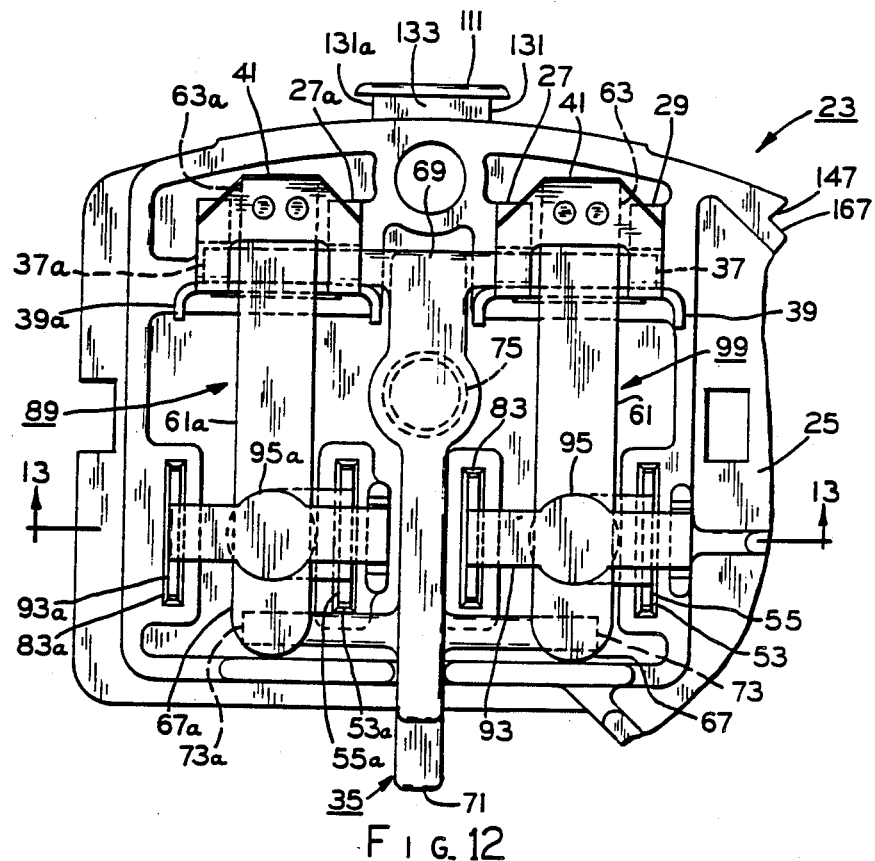
FIG. 12 is a partial front elevational view of another alternative terminal board assembly and illustrating principles which may be practiced in another alternative method of assembling a switch device in one form of the invention.
Figure 13:
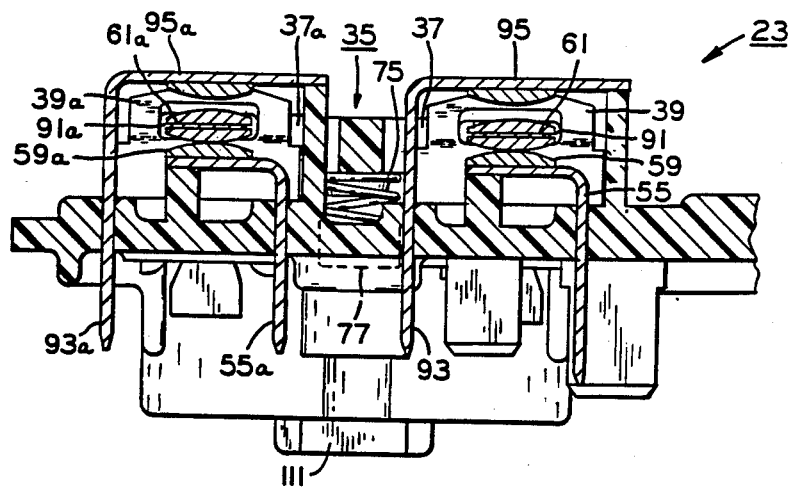
FIG. 13 is a sectional view taken along line 13—13 in FIG. 12.

In FIGS. 12 and 13, there is illustrated an alternative, double-pole double-throw switch device 99 and another alternative method of assemblying such switch device in one form of the invention. Alternative switch device 99 has generally the same component parts assembled and functioning generally in the same manner as those previously discussed with the exceptions noted hereinafter, and while such alternative assembling method meets at least some of the objects stated above, it is believed that such alternative assembling method also has indigenous objects and advantageous features as will be in part apparent and in part pointed out in the following discussion.

In this alternative assembling method, stop 81 is also omitted. Another double contact 91 is provided on switch element 61 adjacent free end 67 thereof in the place of the previously discussed movable contact 65, and the predetermined deformation of the switch element urges double contact 91 thereon in making engagement with stationary contact 59 on terminal 55. Another stop terminal 93 is predeterminately positioned in slot 83 in terminal board body 43 and secured thereto in the same manner and at the same time that stop terminal 93a is disposed in its slot 83a and secured to the terminal board body. When stop terminal 93 is secured to terminal board body 43, another stationary contact 95 on a deformed end section 41 of the stop terminal is arranged generally in overlaying spaced apart relation with stationary contact 59 on terminal 55 for making and breaking relation with double contact 91 on switch element 61. Upon the removal of holding force F from actuating lever 35, the compressive force of spring 75 is effective to displace the actuating lever from the depressed position toward the assembled position thereof, as previously discussed. Upon this resiliently urged movement of actuating lever 35 toward its assembled position, opposite extensions 73, 73a on the actuating lever drivingly engage switch elements 61, 61a at least generally adjacent free ends 67, 67a thereof so as to effect the pivotal displacement of the switch elements about deformed end sections 41 of terminals 39, 39a, respectively. In response to the pivotal displacement of switch elements 61, 61a, movable double contacts 91, 91a thereon are broken from stationary contacts 59, 59a on terminals 55, 55a and moved into making engagement with stationary contacts 95, 95a on stop terminals 93, 93a, respectively. Thus, it may be noted that the making engagements between double contacts 91, 91a on switch elements 61, 61a with stationary contacts 95, 95a on stop terminals 93, 93a not only limits the pivotal displacement of actuating lever 35 with respect to opposite face 25 on terminal board body 43 but also is effective to assist in defining the assembled position of the actuating lever, respectively. It is believed that the association of generally side-by-side double-pole double-throw switch elements 61, 61a of switch device 99 with terminal board body 43 further illustrates the aforementioned termination convenience and component mounting versatility of terminal board 23.

With reference again to the drawings in general and recapitulating at least in part with respect to the foregoing, terminal board 23 has body 43, and bosses 27, 29 and 27a, 29a are spaced apart on the body (FIGS. 1-9). Terminals or terminal means 39, 39a are provided for respective securement to body 43 at least generally adjacent bosses 27, 29 and 27a29a, and each terminal means includes deformed end section 41 associated at least in part in overlying relation with at least one of the bosses (FIG. 2- 4). Means, such as for instance switch element 61 or the like, secured to terminal means 39 is operable generally for switching between a pair of conductive modes, and means, such as actuating lever 35 or the like for instance, is provided for actuating switching means or switch element 61 toward at least one of the conductive modes thereof (FIGS. 2 and 5-7). Actuating means or actuating lever 35 includes opposite trunnions 37, 37a pivotally received between bosses 27, 29 and 27a, 29a deformed sections 41 of terminal means 39, 39a in the overlaying relation therewith, respectively (FIGS. 2 and 7).

Figure 14A:
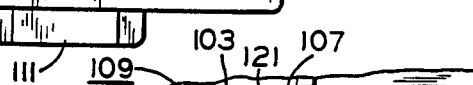
FIG. 14A is a partial view taken from FIG. 14.
Figure 14:
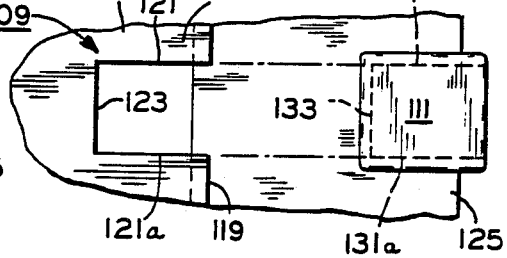
FIG. 14 is an exploded perspective partial view of a dynamoelectric machine and illustrating principles which may be practiced in a method of assembling a dynamoelectric machine.
Figure 16:
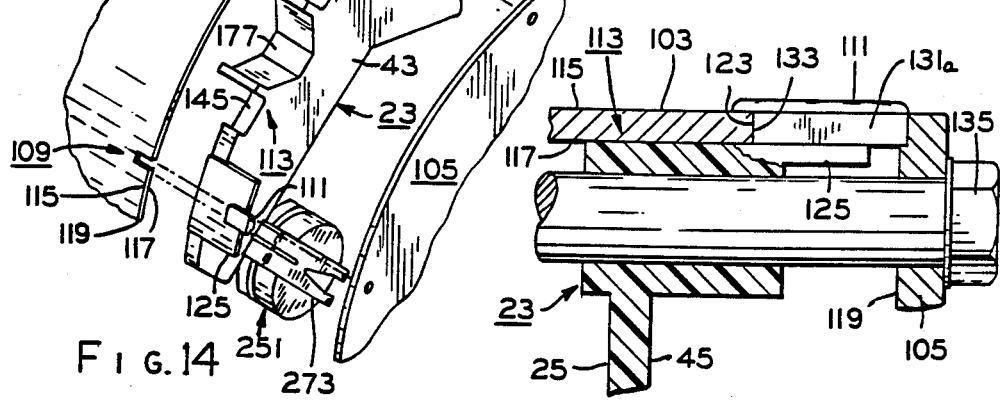
FIG. 16 is a sectional view taken along line 16—16 in FIG. 15.
Figure 15:
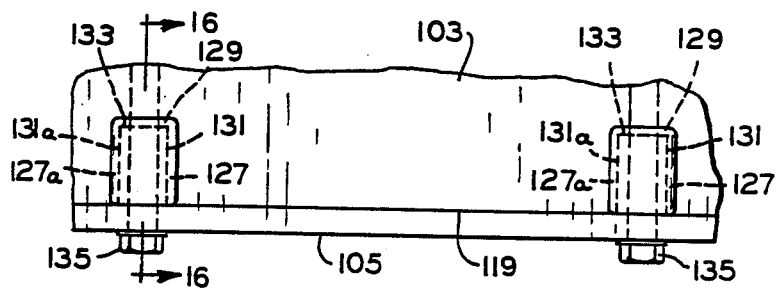
FIG. 15 is a partial top elevational view taken from FIG. 14 and illustrating the components shown therein in assembly relation.

A method of assembling a dynamoelectric machine 101 is also provided with the dynamoelectric motor having a housing or housing means 103, at least one end frame 105, and terminal board 23 (FIGS. 14-17). Housing 103 includes at least one end or end portion 107 having a set of spaced apart slots or mounting openings 109 formed therein. (FIGS. 14 and 15). Terminal board 23 includes opposite faces 25, 45 with peripheral portion 47 interposed therebetween and also a set of spaced apart pads or tabs 111 associated with a part 113 of the peripheral portion and extending therebeyond, respectively (FIG. 14). In practicing this assembling method, pads 111 on terminal board 23 are inserted into assembly positions in engagement with slots 109 in end portion 107 of housing 103, and the pads are overlaid in part with at least an exterior surface or outer circumferential surface 115 on the housing about the slots therein, respectively (FIGS. 15 and 16). Terminal board 23 is positioned or arranged in a preselected position therefor within an interior surface or inner circumferential surface 117 of housing 103, and peripheral portion part 113 of the terminal board assembly is disposed at least generally adjacent the inner circumferential surface of the housing when pads 111 are in the respective assembly positions thereof. (FIG. 16). End frame 105 is mounted in an assembly position on housing 103 in engagement with end portion 107 thereof and with pads 111, and thereby the pads are retained against displacement from the assembly positions thereof in slots 109 past the end portion of the housing, respectively (FIGS. 15 and 16).

More particularly and with specific reference to FIGS. 14–16, end portion 107 of dynamoelectric machine housing 103 has an end surface 119 thereon intersecting with outer and inner circumferential surfaces 115, 117 and slots 109 each include a pair of opposed side edges 121, 121a with a cross-edge 123 interposed therebetween. Opposed side edges 121, 121a intersect with outer and inner circumferential surfaces 115, 117 and with end surface 119 of housing 103, and cross-edge 123 intersects with the outer and inner circumferential surfaces while being spaced apart from the end surface.

A set spaced apart flanges or flange means 125 are integrally provided on terminal board body 43 extending from at least generally adjacent peripheral portion part 113 of the terminal board body beyond opposite face 45 thereof, and pads 111 are integrally formed with the flanges extending beyond the peripheral portion part of the terminal board body, respectively. A pair of opposite side recesses 127, 127a with a cross-recess 129 interposed therebetween are provided in each pad 111, and the opposite side recesses and cross-recess define between each pad and flange 125 a corresponding pair of opposite side grooves or groove means 131, 131a with a cross-groove or groove means 133 interposed therebetween.

To assemble terminal board 23 with dynamoelectric machine 101, pads 111 on terminal board body 43 are disposed at least generally adjacent end surface 119 of housing 103 with opposite surface 25 of the terminal board body facing generally toward the housing, and the pads are generally aligned with slots 109 in the housing, respectively. Upon the alignment of pads 111 on terminal board body 43 with slots 109 in housing 103, terminal board assembly 23 is moved generally toward the housing, and opposite side grooves 131, 131a of the pads are entered into registry with opposed side edges 121, 121a of the slots, respectively. When opposed side edges 121, 121a of slots 109 are so received within opposite side grooves 131, 131a of pads 111, the opposite side grooves may slide along the opposite side edges to enter cross-edges 123 of slots in registry within croos-grooves 133 of the pads thereby to dispose the pads in the assembly positions thereof, respectively. With pads 111 in their assembly positions, the pads and flanges 125 are at least in part overlaid in engagement with outer and inner circumferential surfaces 115, 117 of housing 103 generally about slots 109 therein, respectively, and peripheral portion part 113 of terminal board body 43 is disposed at least generally adjacent the inner circumferential surface of the housing in confronting relation therewith. Thus, it may be noted that the overlaying of pads 111 and flanges 125 with outer and inner circumferential surfaces 115, 117 of housing 103 about slots 109 therein is believed to effectively seal the slots against the passage therethrough of foreign materials which may be present in the environment in which dynamoelectric machine 101 is operated. Although opposed side grooves 131, 131a and cross-groove 133 are illustrated herein as being defined between pads 111 and flanges 125 for convenience of disclosure, it is contemplated that such opposed side grooves and cross-groove may be formed only in the pads. As previously mentioned, terminal board body 43 is formed of a resin material; therefore, it may be noted that pads 111 are deformable when associated in the mounting relation thereof with housing slots 109 to accommodate or compensate for variations in dimensional tolerances or build-ups thereof in housing 103 and/or terminal board body 43, i.e., between the associated components of the housing and terminal board body. Further, it may also be noted that the positive location of pads 111 with housing slots 109, as well as the aforementioned tolerance variation accommodating deformation of the pads, is effective to assure the disposition of terminal board 23 in the preselected position thereof with respect to housing 103 wherein switch device supporting face 25 and terminal connection face 45 of the terminal board are positively located within the housing. To complete the description of the method of assembling terminal board 23 with dynamoelectric machine 101, end frame or end frame means 105 is associated or mounted in an assembly position with end portion 107 of housing 103 by suitable means, such as for instance a set of through-bolts 135 or the like, and in such assembly position, the end frame is engaged with end surface 119 on the housing and with pads 111 thereby to retain the pads in their assembly positions against displacement from housing slots 109 past the end surface on the housing, respectively.

Figure 17:
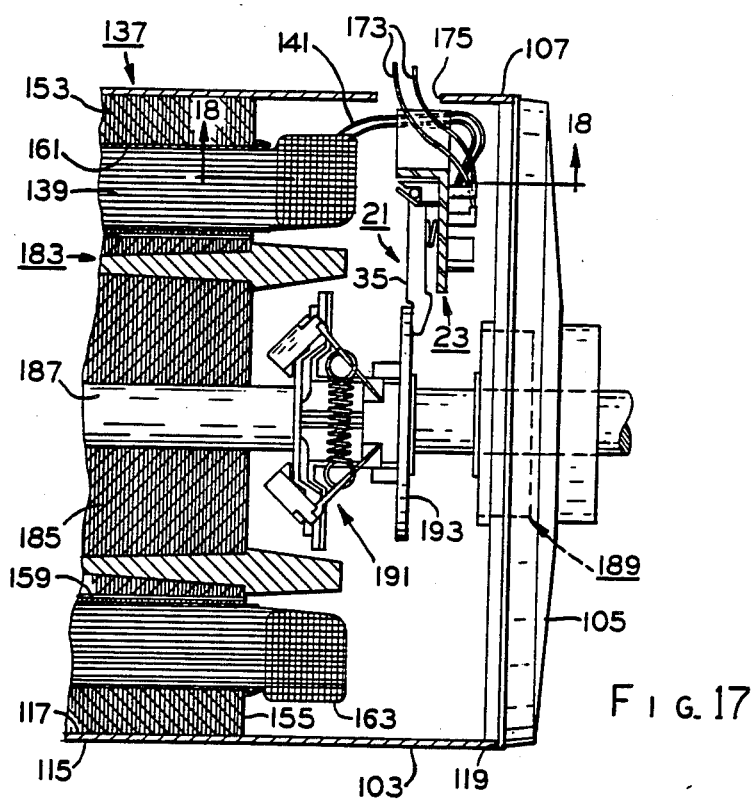
FIG. 17 is a partial sectional view of an alternative dynamoelectric machine and illustrating principles which may be practiced in an alternative method of assembling a dynamoelectric machine.
Figure 18:
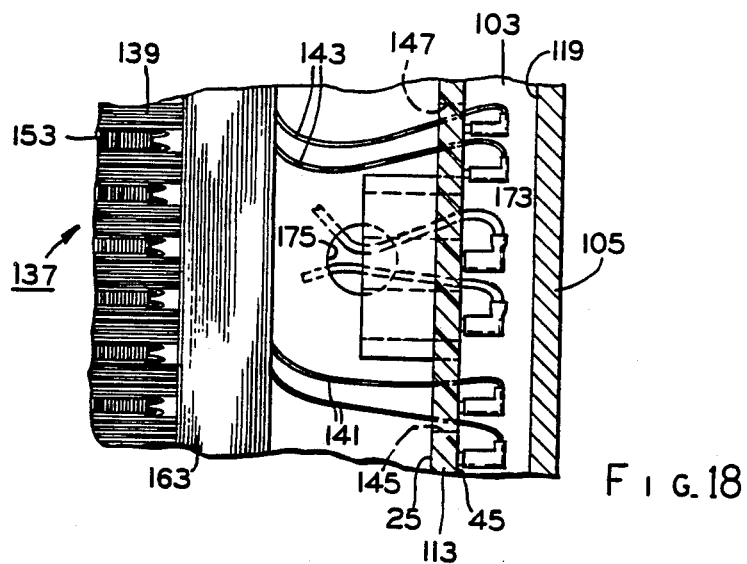
FIG. 18 is a sectional view taken along line 18—18 in FIG. 17.
Figure 19:
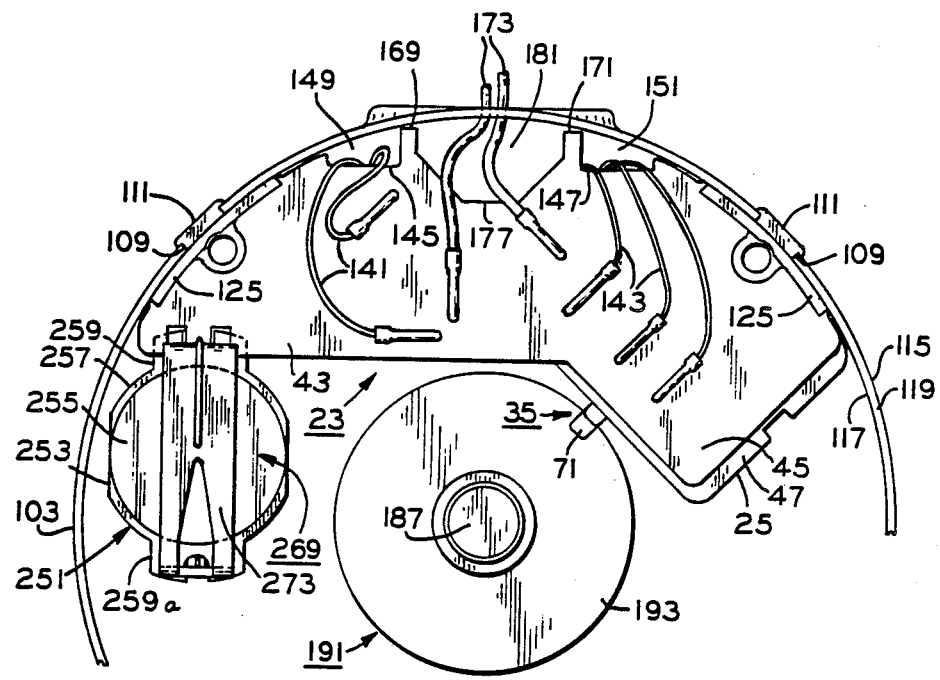
FIG. 19 is a partial right side elevational view of the dynamoelectric machine of FIG. 17 with an end frame thereof removed for clarity.

With reference again to the drawings in general and recapitulating at least in part with respect to the foregoing, dynamoelectric machine 101 is illustrated as having housing 103 including exterior and interior surfaces 115, 117 with end surface 119 interposed therebetween and slots 109 intersecting with the exterior, interior and end surfaces, respectively (FIGS. 14–19). Terminal board 23 is removably mounted in a preselected position with housing 103 and comprises peripheral portion 47 interposed between opposite faces 25, 45 with peripheral portion part 113 being disposed at least generally adjacent interior surface 117 of the housing (FIGS. 16, 17 and 19). Terminal board 23 also has a set of means removably associated with slots 109 for displacement preventing engagement with housing 103 toward and away from exterior and interior surfaces 115, 117 thereof, the displacement preventing means including a set of means, such as flanges 125 or the like for instance, extending from at least generally adjacent peripheral portion part 113 of terminal board 23 beyond opposite face 25 thereof for engagement with the interior surface of the housing generally about the slots therein, and a set of means, such as pads 111 or the like for instance, on the engagement means or flanges 125 disposed in part within the slots for locating in engagement with at least a part of the housing therewithin and for engagement with the exterior surface of the housing generally about the slots therein, respectively (FIG. 16). Means, such as end frame 105 or the like for instance, is mounted to housing 103 in engagement with end surface 119 thereof and with terminal board body 43 for retaining locating and engagement means or pads 111 against displacement from housing slots 109 past the end surface of the housing, respectively (FIGS. 14, 15 and 19).

Further, there is also illustrated a method of assembling dynamoelectric machine 101 and with the dynamoelectric machine having housing or housing means 103 for housing at least a stationary assembly 137 and terminal board 23 (FIGS. 17–19). Stationary assembly 137 includes winding means 139 adapted for excitation and having a set of winding means leads 141, 143 (FIGS. 17 and 18). Terminal board 23 includes opposite faces 25, 45 with peripheral portion 47 interposed therebetween and also a set of recesses or recess means 145, 147 spaced apart in peripheral portion part 113 and extending across the opposite faces, respectively (FIGS. 14 and 19). In the practice of this assembling method, winding means leads 141, 143 are associated with recesses 145, 147, and the winding means leads are extended across opposite faces of terminal board 23, respectively (FIGS. 17-19). Peripheral portion part 113 of terminal board 23 is disposed at least generally adjacent inner circumferential surface 117 of housing 103, and thereby a set of separate passages or passage means 149, 151 are established between recesses 145, 147 in the peripheral portion part and the inner circumferential surface of the housing with winding means leads 141, 143 extending through the separate passages, respectively (FIG. 19).

More particularly and with specific reference to FIGS. 17-19, stationary assembly 137 is supported or otherwise mounted in a preselected or assembly position therefor on inner circumferential surface 117 of housing 103, and the stationary assembly includes a stator 153 which may comprise a plurality of stacked laminations of a ferromagnetic material; however, it is contemplated that the stator may be edgewise wound from a generally thin strip of ferromagnetic material. At least one end face 155 on stator 153 is interposed between a peripheral or circumferential surface 157 thereof and a generally axial bore 159 extending through the stator, and at least a part of the stator peripheral surface may be, if desired, press-fitted into mounting engagement with inner circumferential surface 117 of housing 103. While stationary assembly 137 is illustrated herein as being supported within housing 103 by the press-fitted mounting relation of stator 153 with the housing for purposes of disclosure, it is contemplated that other means may be provided for supporting the stationary assembly within the housing. A plurality of winding or winding receiving slots 161 extend through stator 153 intersecting with end face 155 and bore 161 thereof, and winding means 139 are received in the winding slots with a part of the winding means being arranged in at least one generally annular grouping 163 thereof extending from the end face of the stator generally about the bore thereof. While winding means leads 141, 143 are illustrated herein as being brought out or extended from winding means 139 at two separate locations generally adjacent end face 155 of stator 153, it is contemplated that the winding means leads may be brought out from the winding means at only one location or at more than two locations, and it is also contemplated that the winding means leads may be brought out or extended from end turn grouping 163 of the winding means. Furthermore, although only two sets of winding means leads 141, 143 are illustrated herein as being extended from winding means 139 for purposes of disclosure, it is contemplated that each winding means set may have one or more winding leads and that such winding leads may be associated with each other so as to extend from the winding means in separate groups or groupings thereof.

Peripheral portion part 113 on body 43 of terminal board 23 includes a pair of spaced apart flats 165, 167 thereon which are separated from each other by a pair of spaced apart walls or wall means 169, 171 extending from the flats, and the flats and walls are integrally formed with body 43 at peripheral portion part 113 thereof so as to extend across or between opposite faces 25, 43 on the body, respectively, as best seen in (FIGS. 8 and 17). Thus it may be noted that adjacent ones of flats 165, 167 and walls 169, 171 are associated with each other to define recesses 145, 147 in peripheral portion part 113 on terminal board body 43, respectively. Therefore, winding means leads 141, 143 are arranged on flats 165, 167 at least adjacent walls 169, 171 when the winding means leads are extended across opposite faces 25, 45 of terminal board body 43.

Upon the placement of winding means leads 141, 143 in recesses 145, 147 of terminal board body 43 so as to extend across opposite faces 25, 45 thereof, terminal board 23 may be mounted in its preselected position to housing 103 at least in part within inner circumferential surface 117 thereof and at least generally adjacent housing end portion 107, and when the terminal board is so mounted in its preselected position, switch means supporting face 25 on body 43 of the terminal board assembly is faced generally toward stationary assembly 137, as best seen in FIG. 15. While the association of pads 111 on terminal board assembly 23 with mounting slots 109 in housing 103 have been illustrated and discussed hereinbefore for locating the terminal board in its preselected position for purposes of disclosure, it is contemplated that other means may be utilized for locating the terminal board in the housing. As terminal board 23 is disposed in its preselected position in housing 103, it may be noted that peripheral portion part 113 of terminal board body 43 is disposed or otherwise arranged at least generally adjacent inner circumferential surface 117 of the housing, and in this located or preselected position of the terminal board, spaced apart passages 149, 151 are established or defined between recesses 145, 147 in the peripheral portion part of the terminal board body and the inner circumferential surface of the housing for the passage therethrough of winding means leads 141, 143 thereby to contain or isolate the winding means leads from each other, respectively, as best seen in FIG. 19.

It may be noted that the extension of winding means leads 141, 143 from winding means 139 through passages 149, 151 formed between terminal board 23 and housing 103 predeterminately locates the winding means leads at least generally adjacent inner circumferential surface 117 of the housing so as to predeterminately maintain the winding means leads in spaced apart relation from deleterious interfering engagement with other operating components of dynamoelectric machine 101 as best seen in FIG. 18 and as discussed hereinafter. while winding means leads 141, 143 are illustrated and described herein as passing through separate passages 149, 151, it is contemplated that the winding means leads may be associated with terminal board 23 so as to extend through only one of the separate passages.

When winding means leads 141, 143 are captured within passages 149, 151 so as to extend across opposite faces 25, 45 of terminal board body 43, as discussed above, the winding means leads may be terminated at terminal connection face 45 of terminal board 23 with electrical connector sections 57 of respective ones of the terminals extending therefrom, as best seen in FIG. 19. The termination of the winding leads 141, 143 the aforementioned terminals may be effected by any suitable means, such as for instance interconnecting quickconnect fittings on the winding means leads with electrical connector sections 57 of the aforementioned respective ones of the terminals extending from terminal connection face of terminal board 23. It is contemplated that winding leads 141, 143 may be terminated at terminal connection face 45 of terminal board 23 either before or after the terminal board is disposed in its preselected position in housing 103. With winding leads 141, 143 so electrically interconnected with terminal board 23, end shield 105 may be mounted to housing 103 by through-bolts 135 which pass through stator 153 and the end shield, respectively, as well known in the art, thereby to enclose dynamoelectric machine 101, as best seen in FIGS. 16 and 17.

Prior to the aforementioned enclosure of dynamoelectric machine 101, a set of power leads 173 may be electrically connected with terminal board 23, if desired. Means, such as for instance an opening 175 or the like, for receiving power leads 173 or for the passage therethrough of the power leads may be provided in housing 103 intersecting with outer and inner circumferential surface 115, 117 thereof and spaced generally between end face 155 of stator 153 and housing end portion 107, as best seen in FIG. 17. Further, another recess or a power lead recess 177 in the aforementioned recess set of terminal board 23 is provided in peripheral portion part 113 of terminal board body 43 generally between spaced apart walls 169, 171 so as to extend across opposite faces 25, 45 of the terminal board body, and the power lead recess may include, if desired, a flange or flange means 179 extending generally perpendicularly from the terminal board body beyond opposite face 25 thereof. When terminal board 23 is disposed in the preselected position in housing 103, as previously discussed, power lead recess 177 defines another passage or passage means 181 with inner circumferential surface 117 of the housing. Thus, power leads 173 may be passed through opening 175 provided therefor in housing 103 and through passage 181 defined between the housing and terminal board 23 so as to extend across opposite faces 25, 43 thereof. Thus, it may be noted that power leads 173 are captured in passage 181 between terminal board 23 and housing 103 thereby to be isolated from winding means leads 141, 143 captured in passages 149, 151, and in this manner, it may also be noted that the power leads are also predeterminately maintained at least adjacent inner circumferential surface 117 of the housing so as to be spaced from operating components of dynamoelectric machine 101, as later discussed. Power leads 173 may be terminated at termination connection face 45 of terminal board 23 generally in the same manner as discussed hereinabove with respect to the termination of winding leads 141, 143. Albeit not shown for purposes of brevity of disclosure and drawing simplification, it is contemplated that power leads 173 may be disposed within recess 177 therefor in terminal board 23 prior to the disposition of the terminal board in its preselected position in housing 103 thereby to also capture the power lead within passage 181 defined between recess 177 in peripheral portion part 113 of terminal board body 43 and inner circumferential surface 111 of the housing. Further and without illustration herein for purposes of brevity of disclosure and drawing simplification, it is also contemplated that power leads 173 may be later associated with dynamoelectric machine 101 generally in the same manner as discussed above, such as for instance by a purchaser or user of the dynamoelectric machine; however, such later association of the power leads would, of course, necessitate the removal and replacement of end frame 105.

Again with reference to the drawings in general and recapitulating at least in part with respect to the foregoing, dynamoelectric machine 101 is illustrated as being adapted for connection through power leads 173 therefor with a power source (not shown) (FIGS. 17-19). Dynamoelectric machine 101 has housing means 103 for housing therewithin at least terminal board 23 and stationary assembly 137, and the stationary assembly includes winding means 139 having leads 141, 143 and with the winding means being adapted for excitation upon the connection of the dynamoelectric machine with the power source (FIGS. 5, 17 and 18). Terminal board 23 includes opposite faces 25, 45 with peripheral portion 47 interposed therebetween, respectively (FIG. 19). Terminal board 23 also includes a set of separate recess means, such as at least recesses 145, 147 for instance, in peripheral portion 47 and arranged generally in confronting relation with housing means 103 for defining therewith a set of passage means, such as for instance at least passages 149, 151 or the like, for the passage through at least some of the passage means of winding means leads 141, 143 with the passage means being separate from each other to isolate the winding means leads contained within the passage means from each other, respectively (FIG. 19).

More particularly and with specific reference to FIGS. 17-19, dynamoelectric machine 101 has a rotatable assembly 183 associated with stationary assembly 137 in magnetic coupling relation with winding means 139 thereof and supported in journaled relation with at least end frame 105. Rotatable assembly 183 includes a squirrel-cage type rotor 185 disposed at least in part in bore 159 of stator 153, and the rotor is secured about a shaft 187 which is rotatably received within a lubrication and bearing system therefor, indicated generally at 189, and supported on end frame 105. While rotor 185 is illustrated herein as being of a squirrel-cage type, it is contemplated that various other types of rotors well known to the art may be utilized with dynamoelectric machine 101 within the scope of the invention so as to meet at least some of the objects thereof. A centrifugal mechanism 191 is secured in a preselected position on shaft 187 so as to be conjointly rotatable therewith, and the centrifugal mechanism includes a push-collar 193 axially movable in response to rotational speed of the shaft for effecting the operation of switch device 25 of terminal board 23, as discussed hereinafter. To complete the description of dynamoelectric machine 101, winding means 139 comprises at least a start or auxiliary winding or winding section and a run or main winding or winding section connected through winding means leads 141, 143 in circuit relation with switch device 21 of terminal board 23, respectively; however, it is contemplated that various other types of winding means have different winding configurations and connections may be employed in dynamoelectric machine 101.

In the operation of dynamoelectric machine 101, assume it to be deenergized or at a standstill with push-collar 193 of centrifugal mechanism 191 engaged with driven end 71 on actuating lever 35 of switch device 21 mounted to opposite face 25 of terminal board 23, as best seen in FIG. 17. When dynamoelectric machine 101 is deenergized, push collar 193 of centrifugal mechanism 191 pivotally urges actuating lever 35 against the compressive force of spring 75 toward opposite face 25 of terminal board 23 thereby to disengage extension 73 on the actuating lever from free end 67 of switch element 61, as best seen in FIG. 5. With extension 73 so disengaged from switch element 61, the switch element is resiliently biased about deformed section 41 of terminal 39 so as to make movable contact 65 on free end 67 of the switch element with stationary contact 59 on terminal 57. This making engagement of contacts 59, 65 connects the auxiliary and main winding sections in winding means 139 of dynamoelectric machine 101 in circuit relation with each other and which circuit relation is well known to the art.

When dynamoelectric machine 101 is selectively connected to the aforementioned power source (not shown) through power leads 173, winding means 139 is excited to effect rotation of rotatable assembly 183 in response to the magnetic coupling relation thereof with the excited winding means, and centrifugal mechanism 191 is, of course, conjointly rotatable with the rotatable assembly. When rotatable assembly 183 at least approaches a preselected rotational speed, i.e., the synchronous speed of dynamoelectric machine 101, in response to the starting energization or operation of the dynamoelectric machine, push-collar 193 of centrifugal mechanism 191 is retractively movable on shaft 187 in a direction toward rotor 185, and such retractive movement of the push-collar effects the disengagement thereof from driven end 71 of actuating lever 35 on terminal board 23, as best seen in FIG. 7. During this retractive movement of push-collar 193 on shaft 187, the compressive force of spring 75 effects pivotal movement of actuating lever 35 about its pivoted end 69 thereby to maintain driven end 71 of the actuating lever in following engagement with the push-collar until the actuating lever is abutted with its stop 81. In response to the resiliently urged pivotal movement of actuating lever 35 toward its stop 81, extension 73 on the actuating lever is moved into engagement with free end 67 of switch element 61 thereby to pivotally bias the switch element about deformed end section 41 of terminal 39 toward a position breaking movable contact 65 on the switch element from stationary contact 59 on terminal 55. Upon the disengagement of contacts 59, 65, the aforementioned circuit relation of the auxiliary and main winding section of winding means 139 is interrupted, and the main winding section of the winding means continues to be energized or excited during the running energization or operation of dynamoelectric machine 101 in a manner well known to the art. If a more detailed discussion of the construction and operation of centrifugal mechanism 191 is desired, reference may be had to U.S. Pat. No. 4,208,559, issued June 17, 1980 to Steven J. Gray, which is incorporated by reference herein. Furthermore, when different winding arrangements are utilized in dynamoelectric machine 101 as previously mentioned, it is contemplated that the dynamoelectric machine may be energized without the utilization of switch device 21 on terminal board assembly 23 and without the utilization of centrifugal mechanism 191.

Figure 20:
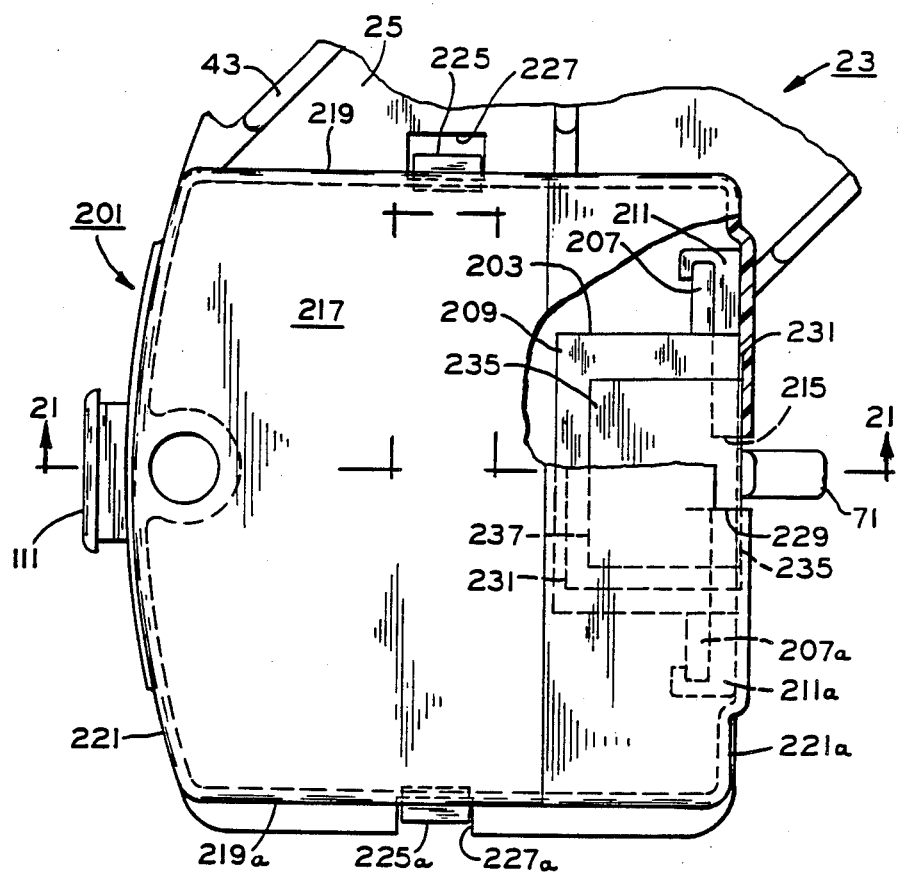
FIG. 20 is a partial top elevational view of the terminal board assembly showing an enclosure for sealing the switch device on the terminal board assembly from contamination by foreign particles.
Figure 21:
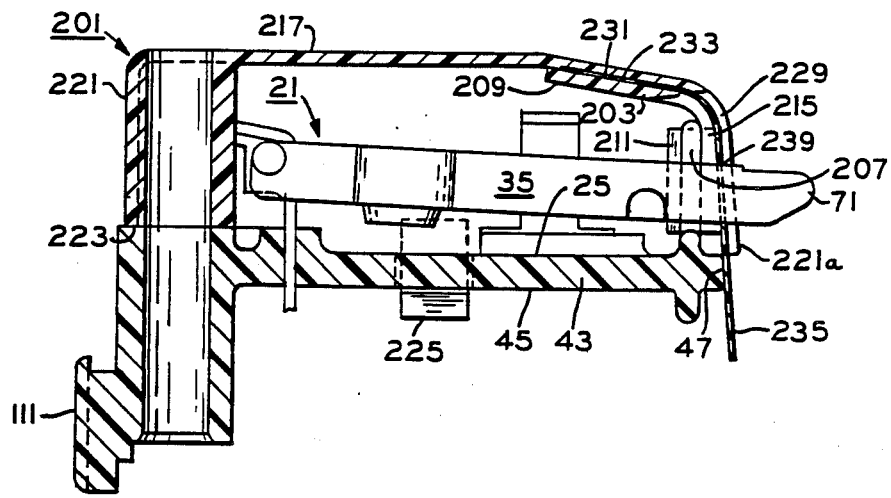
FIG. 21 is a sectional view taken along line 21—21 in FIG. 20.

With reference to FIGS. 20 and 21, terminal board 23 may be provided in one form of the invention with enclosure or enclosure means 201 for sealing any one of switch devices 21, 89, 99 on the terminal board against contamination by foriegn paricles in the event dynamoelectric machine 101 is operated in an environment of such foriegn particles. While enclosure 201 is intended to be utilized on terminal board 23 with any respective one of switch devices 21, 88, 99, the enclosure will be discussed hereinafter only in conjunction with switch device 21 for the purpose of brevity of disclosure.

Enclosure 201 includes a pair of cover means, such as for instance plate 203 and cover 205 or the like for instance, and the plate and cover are associated with body 43 of terminal board 23 for extending in part in enclosing relation about switch device 21. A pair of spaced apart extensions or extension means 207, 207a are integrally formed with body 43 at least adjacent its peripheral portion 47, and driven end 71 of actuating lever extends between the extensions beyond the peripheral portion of the body. Plate 203 has an intermediate section 209 spanning across extensions 207, 207a, and a pair of generally opposite mounting arms 211, 211a extend from the intermediate section so as to be releasable secured or mounted in gripping engagement with the extensions, respectively. When plate 203 is located in an assembled position on body 43 of terminal board 47 with mounting arms 211, 211a releasably gripped in engagement with spaced extensions 207, 207a, a base edge 213 on intermediate section 209 is seated in abutment or sealing engagement against face 25 of terminal board body 23 at least adjacent its peripheral portion 47 so as to extend at least between the spaced extensions. Passage means, such as an opening or slot 215 or the like for instance, is provided in intermediate section 209 of plate 203 and receives driven end 71 of actuating lever 35 for switch device 21 so as to accommodate the above discussed movement of the actuating lever upon the operation of the switch device.

Cover 205 extends at least in part over switch device 21 and plate 203, and a top or top wall 217 of the cover is spaced from face 25 of terminal board body 23 so as to span across the switch device. Top wall 217 is integrally formed with opposite pairs of depending sides or sidewalls 219, 219a and 221, 221a on cover 205 which are arranged in spaced relation about switch device 21, and adjacent ones of the sidewalls are integrally formed with each other. Another base edge 223 defined on the free ends of sidewalls 219, 219a, 221, 221a is seated in abutment or sealing engagement with terminal board body 43, such as for instance face 25 on the body. Another set of mounting means, such as hooks 225, 225a or the like for instance, are provided on sidewalls 219, 219a extending therefrom through a pair of apertures 227, 227a in terminal board body 43 so as to be releasably secured on mounted in gripping engagement with terminal connection face 45 of the terminal board body.

When cover 205 is located in an assembled position on terminal board body 43 with hooks 225, 225a extending through apertures 227, 227a into releasable engagement with terminal connection face 45 of the terminal board body, passage means, such as an opening or slot 229 or the like for instance, in cover 205 is arranged generally in aligned relation with opening 215 in plate 203. Opening 229 extends through sidewall 221a and in part through top wall 217 of cover 205, and the opening intersects base edge 223 at sidewall 221a. A recess 231 is provided in cover 205 extending about opening 229, and it may be noted that the recess is overlaid by intermediate section 209 of plate 203 thereby to form a seal receiving groove or groove means 233 between the recess and the intermediate section. Since opening 229 in cover 205 is at least in part aligned with opening 215 in plate 203, as previously mentioned, driven end 71 of actuating lever 35 also extends through opening 229 which also accommodates the above discussed movement of the actuating lever upon the operation of switch device 21. While both plate 203 and cover 205 are provided with the configurations shown herein for purpose of disclosure and are formed of a Lexan resin material available from the General Electric Company, Fairfield, Conn., it is contemplated that other covers and plated having different configurations and formed of other materials may be utilized.

Seal means, such as a strip seal 235 or the like for instance, extends in sliding and sealing relation across intermediate section 229 of plate 205, and marginal edges or edge portions 237 on the stip seal are slidably received in goove means 233 in sealing engagement between recess 231 of the cover and the intermediate section overlaid with the recess. Another opening 239 in strip seal 235 is disposed in sealing engagement about actuating lever 35 adjacent its driven end 71. Thus, it may be noted that the sealing relation of strip seal 235 with actuating lever 35, plate 203 and cover 205, as discussed above, is effective to prevent the entry of foreign particles into enclosure 201 through opening 215 in the plate and opening 229 in the cover. It is also believed that the engagement of base edge 213 on plate 203 and base edge 223 on cover 205 with terminal board body 43 is also effective to prevent the entry of foreign particles into enclosure 201. Since strip seal opening 239 is disposed in sealing engagement about actuating lever 35, it may also be noted that the above discussed movement of the actuating lever is effective to slide or move strip seal 235 in groove means 233, as discussed above, so as to accommodate such actuating lever movement. To complete the description of enclosure 201, strip seal 235 may be formed from a Mylar sheet material available from E. I. du Pont de Nemours and Company, Wilmington, Del.; however, it is contemplated that other seals having different configurations and formed of different materials may be.

As best seen in FIGS. 9 and 9A, terminal board 23 supports an overload device 251, and albeit not shown, the overload device is adapted to be connected in circuit relation with winding means 139 of dynamoelectric machine 101 in a manner well known to the art. Overload device 251 has a casing 253 with a plurality of walls or wall means, such as a base wall 255 integrally formed with a sidewall 257 or the like for instance, and a pair of generally opposite flanges 259, 259a with a pair of opposite notches 261, 261a therein extend from the sidewall adjacent a free end thereof.

An extension or extension means 263 is integrally formed with face 25 on body 43 of terminal board 23 at least adjacent peripheral edge portion 47. Extension 263 extends from face 25 on body 43, and a detent 265 and a ledge 267 are integrally formed on the extension adjacent the free end thereof with the ledge being disposed adjacent the detent and arranged in facing relation with face 25.

A cradle or cradling means, indicated generally at 269, is integrally formed on body 43 of terminal board 23 and extends therefrom for cradling overload device 251 when it is supported on the terminal board, Cradling means 269 includes a pair of laterally spaced apart legs 271, 271a, and leg 271 is integrally formed with body 43 extending or depending from terminal connection face 45 of the body. A split strap or strap means 273 is integrally formed between legs 271, 271a so as to be laterally spaced from terminal connection face 43 of terminal board body 43. Another detent 255a is integrally formed on leg 271a adjacent the free end thereof, and detent 255a is arranged generally in opposed relation with detent 255 on extension 263. Another ledge 257a is also integrally formed on leg 271a adjacent detent 255a, and ledge 257a is arranged in facing relation with strap 273 and generally in coplanar relation with ledge 257 on extension 263. It may be noted that at least strap 273 and leg 271 may be yieldable or resiliently displaced to receive overload device 251 in cradling means 269. When overload device 251 is received in supporting relation by cradling means 269, it may be noted that opposed detents 255, 255a are disposed in opposite notches 261, 261a in opposite flanges 259, 259a of casing 253 thereby to retain the overload device against rotational or horizontal displacement from between opposite legs 271, 271a of the cradling means. Further, it may also be noted that opposite flange 259 on casing 253 is captured between ledge 267 and face 25 of terminal board body 43 and opposite flange 259 is captured between ledge 267a and a cooperating shoulder on leg 271a thereby to retain overload device 251 against vertical displacement from between opposite legs 271, 271a of the cradling means.

From the foregoing, it is believed that a novel method of assembling switch devices 21, 89, 99 has been presented meeting the objects and advantageous feature set out hereinbefore, as well as others, and it is contemplated that changes in the precise arrangements, shapes, details and connection of the component parts of such method as well as the precise order of the method steps of such method, may be made by those having ordinary skill in the art without departing from the spirit of the invention or from the scope thereof, as set out in the claims which follow.

What we claim as new and desire to secure by Letters Patent of the United States is:

1. A method of assembling a switch device with a terminal board adapted for use in a dynamoelectric machine, the terminal board including a pair of generally opposite faces with a peripheral edge interposed therebetween, at least a pair of spaced apart bosses extending from one of the opposite faces, and each boss having a free end and also having an open sided recess therein defining a ledge in off-set spaced relation between the free end and the one opposite face, the switch device including a generally elongate actuating lever having a pair of generally opposite ends, and a pair of generally opposite trunnions extending from the actuating lever at least generally adjacent one of the opposite ends thereof, respectively, and at least a pair of terminals and each including an electrical connector section and a deformed end section opposite thereto, the method comprising the steps of:

disposing the actuating lever at least adjacent the one opposite face of the terminal board and arranging the one end of the actuating lever generally between the bosses extending from the one opposite face of the terminal board;

seating the opposite trunnions on the actuating lever on the ledges of the bosses, respectively, and extending the other of the opposite end of the actuating lever beyond the peripheral edge of the terminal board during the disposing and arranging step;

associating the terminals in preselected positions therefor with respect to the terminal board and positioning thereby the terminals at least adjacent the ledges on the bosses, respectively;

extending the terminal connector sections of the terminals beyond the other of the opposite faces of the terminal board and placing the deformed end sections of the terminals at least in part in spaced apart overlaying relation with the ledges of the bosses and in overlaying relation with the free ends of the bosses during the associating and positioning step, respectively; and securing the terminals in their preselected positions to the terminal board and capturing thereby the opposite trunnions between the open sided recesses in the bosses and the terminals, respectively.

2. The method as set forth in claim 1 wherein the switch device further includes at least one generally elongate resilient switch element having a pair of generally opposite ends and wherein the method further comprises the preliminary step of conductively securing one of the opposite ends of the at least one switch element to the deformed end section of one of the terminals and extending the at least one switch element generally in spaced apart relation with the actuating lever upon the association of the one terminal in its preselected position with respect to the terminal board during the association and positioning step.

3. The method as set forth in claim 2 wherein the switch device further includes at least one extension on the actuating lever at least generally adjacent the other opposite end thereof and wherein the method further comprises the additional step of overlaying a part of the at least one switch element at least generally adjacent the other of the opposite ends thereof with a part of the at least one extension on the actuating lever.

4. The method as set forth in claim 3 wherein the switch device includes a stop and wherein the method further comprises the further additional step of securing the stop to the terminal board generally between the actuating lever and the at least one switch element and disposing a part of the stop generally in overlaying relation with the actuating lever generally between the opposite ends thereof.

5. The method as set forth in claim 4 wherein the switch device further includes a spring and wherein the method further comprises the further preliminary step of biasing the spring between the one opposite face of the terminal board and the actuating lever and applying a force onto the actuating lever to contain the compressive force of the spring at least upon the association of the actuating lever with the terminal board during the disposing and arranging step.

6. A method of assembling a switch device with a means for supporting it, the supporting means including at least one face having a peripheral edge, a set of spaced apart bosses extending from the at least one face, and each boss having a free end and a ledge offset from the free end between it and the at least one face of the supporting means, and the switch device including a set of terminals each having a deformed end section, and an actuating lever including a pair of opposite ends, and a pair of generally opposite trunnions extending generally laterally from the actuating lever at least generally adjacent one of the opposite ends thereof, respectively, the method comprising the steps of:

seating the opposite trunnions of the actuation lever on the ledges of at least some of the bosses, respectively, and extending the other of the opposite ends of the actuating lever beyond the peripheral edge of the supporting means;

disposing the terminals in preselected positions therefor on the supporting means at least generally adjacent the bosses and overlaying the deformed end sections on the terminals with the ledges and the free ends of the bosses in spaced relation with the ledges thereof, respectively; and capturing the opposite trunnions of the actuating lever between the terminals and the at least some bosses during the disposing and overlaying step, respectively.

7. The method as set forth in claim 6 wherein the switch device further includes a spring and wherein the seating and extending step includes containing the compressive force of the spring between the actuating lever and the at least one face of the supporting means and retaining thereby the opposite trunnions against displacement from the ledges of the at least some bosses, respectively.

8. The method as set forth in claim 6 wherein the supporting means further includes a stop part and wherein the method further comprises the additional step of releasing the force applied onto the actuating lever to contain the compressive force of the spring and biasing thereby the actuating lever into engagement with the stop part, the opposite trunnions on the actuating lever into engagement with the deformed end sections of the terminals, and the at least one extension means on the actuating lever into engagement with the at least one switch element at least generally adjacent its other opposite end.

9. The method as set forth in claim 7 wherein the method further comprises the additional step of releasing the compressive force of the spring and urging thereby the opposite trunnions toward engagement with the deformed end sections of the terminals, respectively.

10. The method as set forth in claim 6 wherein the switch device further includes at least one switch element and wherein the method further comprises the preliminary step of conductively securing a part of the at least one switch element to one of the terminals, the at least one switch element being arranged generally in laterally spaced relation with the actuating lever during the disposing and overlaying step.

11. A method of assembling a switch device with a means for supporting it, the supporting means including at least one face having a set of spaced apart bosses thereon, and each boss having a free end and a ledge intermediate the free end and the at least one face, and the switch device including an actuating lever having a pair of generally opposite trunnions, and a set of terminals each having a deformed end section, the method comprising the steps of:

seating the opposite trunnions of the actuating lever on the ledges of at least some of the bosses;

associating the terminals in preselected positions therefor on the supporting means and disposing the deformed end sections of the terminals in overlaying spaced apart relation with at least the ledges on the at least some bosses, respectively, and capturing the opposite trunions on the actuating lever between the at least some bosses and the terminals during the associating and disposing step, respectively.

12. The method as set forth in claim 11 wherein the switch device further includes at least one switching means for switching between a set of conductive modes and wherein the method further comprises the preliminary step of conductively associating the at least one switching means with the deformed end section of one of the terminals.

13. The method as set forth in claim 12 wherein the preliminary step includes deforming the switching means and effecting thereby the bias of the switching means toward one of its inductive modes when the one terminal is in its preselected position.

14. The method as set forth in claim 12 wherein the associating and disposing step includes arranging the one switching means generally in laterally spacial relation with the actuating lever.

15. The method as set forth in claim 12 wherein the switch device further includes a spring and wherein the seating step includes biasing the spring between the at least one face of the supporting means and the actuating lever and applying a force onto the actuating lever to overcome the compressive force of the spring acting thereon so as to maintain the trunnions seated on the ledges of the at least some bosses, respectively.

16. The method as set forth in claim 15 further comprising the additional step of removing the applied force on the actuating lever and urging the trunnions on the actuating lever toward pivotal seated engagement with the deformed end sections of the terminals in response to the compressive force of the spring acting on the actuating lever.

17. The method as set forth in claim 15 further comprising the additional step of removing the applied force on the actuating lever and, in response to the compressive force of the spring acting on the actuating lever, urging the actuating lever into engagement with the at least one switching means thereby to bias the at least one switching means toward one of the conductive modes thereof.

18. The method as set forth in claim 16 wherein the switch device further includes a means for engagement with the actuating lever and wherein the associating and disposing step includes securing the engagement means to the supporting means and biasing the actuating lever toward abatement with the engaging means in response to the compressive force of the spring acting on the actuating lever.

19. The method as set forth in claim 17 wherein the switch device further includes another switching means for switching between a set of conductive modes and wherein the method further comprises the preliminary step of conductively securing the another switching means with the deformed end section of another of the terminals.

20. The method as set forth in claim 19 wherein the preliminary step includes deforming the another switching means and effecting thereby the bias of the another switching means toward one of its conductive modes when the another terminal is in its preselected position.

21. The method as set forth in claim 19 wherein the associating and disposing step includes arranging the another switching means generally in laterally spaced relation with the actuating lever.

22. The method as set forth in claim 19 wherein the additional step includes urging the actuating lever into engagement with the another switching means in response to the compressive force of the spring acting on the actuating lever and biasing thereby the another switching means toward one of its conductivity modes at least generally conjointly with the urging of the at least one switching means toward its one conductivity mode by the actuating lever.

23. The method as set forth in claim 22 wherein the switching device further includes at least one contact means for engagement with the other switching means in its one conductivity mode and wherein associating and disposing step includes securing the at least one contact means to the supporting means and associating a part of the contact means generally in overlaying relation with the another switching means and the at least one face of the supporting means.

24. The method as set forth in claim 22 wherein the switching device further includes a pair of contact means for engagement with the one and another switching means in the one conductivity mode thereof and wherein the associating and disposing step includes securing the contact means to the supporting means and associating the contact means in part in overlaying relation with the one and another switching means and with the at least one face of the supporting means, respectively.

* * * * *